United States Patent [19]

McGregor et al.

[11] Patent Number: 5,571,592
[45] Date of Patent: Nov. 5, 1996

[54] PUFFED INSULATIVE MATERIAL

[76] Inventors: Gordon L. McGregor, 5 Copper Beech Ct., Landenberg, Pa. 19350; Raymond B. Minor, 233 Greenhaven Dr., Elkton, Md. 21921

[21] Appl. No.: 395,772

[22] Filed: Feb. 28, 1995

Related U.S. Application Data

[63] Continuation-in-part of Ser. No. 125,092, Sep. 21, 1993, abandoned.

[51] Int. Cl.$^6$ .................... B32B 5/18; B32B 5/24; B32B 5/26; B32B 5/30
[52] U.S. Cl. .................... 428/71; 428/72; 428/74; 428/76; 428/281; 428/283; 428/284; 428/311.1; 428/313.3; 428/314.4; 428/315.5; 428/315.9; 428/317.9; 428/402; 428/903
[58] Field of Search .................... 428/71, 283, 304.4, 428/308.4, 311.1, 314.4, 315.5, 317.9, 402.2, 402.21, 402.22, 72, 74, 313.3, 314.2, 316.6, 402, 903, 920, 76, 281, 284, 315.9

[56] References Cited

U.S. PATENT DOCUMENTS

| | | | |
|---|---|---|---|
| 3,615,972 | 10/1971 | Morehouse, Jr. et al. | 156/79 |
| 3,953,566 | 4/1976 | Gore | 264/288 |
| 4,038,762 | 8/1977 | Swan, Jr. | 36/89 |
| 4,098,945 | 7/1978 | Oehmke | 428/327 |
| 4,108,806 | 8/1978 | Cohrs et al. | 521/54 |
| 4,118,531 | 10/1978 | Hauser | 428/224 |
| 4,153,661 | 5/1979 | Ree et al. | 264/120 |
| 4,273,806 | 6/1981 | Stechler | 427/119 |
| 4,304,713 | 12/1981 | Perelman | 264/45.9 |
| 4,335,044 | 6/1982 | Hedrich | 548/475 |
| 4,373,519 | 2/1983 | Errede et al. | 128/156 |
| 4,483,889 | 11/1984 | Andersson | 427/389.9 |
| 4,551,378 | 11/1985 | Carey, Jr. | 428/198 |
| 4,610,923 | 9/1986 | Schrock | 428/304.4 |
| 4,663,095 | 5/1987 | Battais | 264/45.9 |
| 4,820,575 | 4/1989 | Kolzer | 428/240 |

(List continued on next page.)

FOREIGN PATENT DOCUMENTS

| | | |
|---|---|---|
| 0102335 | 3/1984 | European Pat. Off. . |
| 1560778 | 12/1969 | Germany . |
| 2-160312 | 6/1990 | Japan . |
| 313737 | 2/1991 | Japan . |
| 516273 | 6/1991 | Japan . |
| 3-196991 | 7/1991 | Japan . |
| 162363 | 10/1991 | Japan . |
| 4-335044 | 11/1992 | Japan . |
| 167563 | 1/1993 | Japan . |
| 2025316 | 1/1980 | United Kingdom . |
| 1589022 | 5/1981 | United Kingdom . |
| 9300390 | 1/1993 | WIPO . |
| 9300163 | 1/1993 | WIPO . |

OTHER PUBLICATIONS

"Microcellular Foams," Plastics Technologies (Feb. 1993).
Expancel–Advertisement of Nobel Industries Sweden (date and author unknown).
Polymer Report–L. L. Alderson and K. E. Evans–"The Fabrication of microporous polyethylene having a negative Poisson's ratio" 33 Polymer 4435–4438 (1993).
Thinsulate™ Thermal Insulation Product information, no date.
Thermolite Thin Insulation, DuPont Co., (p. 9), no date.

*Primary Examiner*—Paul J. Thibodeau
*Assistant Examiner*—Vivian Chen

[57] ABSTRACT

The present invention is an insulation material with improved loft characteristics and methods for producing such insulation. The preferred insulation comprises a multiple layered insulation material with discrete fibers having energy expandable thermoplastic microspheres interspersed and contained therein. The use of expandable microspheres allows for (1) the introduction of unexpanded microspheres into pre-constructed insulation; and (2) expansion of the microspheres within the insulation to a diameter greater enough that the microspheres are retained in place. The insulation of the present invention exhibits many improved properties over conventional insulations, such as improved loft, better thermal insulation, improved compression resistance, and improved resilience.

15 Claims, 6 Drawing Sheets

U.S. PATENT DOCUMENTS

| | | | |
|---|---|---|---|
| 4,837,251 | 6/1989 | Okey et al. | 523/218 |
| 4,879,163 | 11/1989 | Woiceshyn | 428/198 |
| 4,939,020 | 7/1990 | Takashima et al. | 428/220 |
| 4,959,395 | 9/1990 | Janda | 521/54 |
| 4,985,296 | 1/1991 | Mortimer, Jr. | 428/220 |
| 4,990,544 | 2/1991 | Asaumi et al. | 521/145 |
| 4,996,097 | 2/1991 | Fischer | 428/220 |
| 5,023,279 | 6/1991 | Buckmaster et al. | 521/85 |
| 5,026,591 | 6/1991 | Henn et al. | 428/198 |
| 5,061,561 | 10/1991 | Katayama | 428/364 |
| 5,102,711 | 4/1992 | Keller et al. | 428/71 |
| 5,110,998 | 5/1992 | Muschiatti | 174/24 |
| 5,115,103 | 5/1992 | Yamanishi et al. | 174/24 |
| 5,128,175 | 7/1992 | Yamanishi et al. | 427/54.1 |
| 5,141,972 | 8/1992 | Sato | 523/218 |
| 5,174,934 | 12/1992 | Saatchi | 264/46.4 |
| 5,209,967 | 5/1993 | Wright et al. | 428/283 |
| 5,238,621 | 8/1993 | Hagen et al. | 264/45.3 |
| 5,292,578 | 3/1994 | Kolzer | 428/240 |
| 5,391,424 | 2/1995 | Kolzer | 428/220 |

PUFFED INSULATIVE MATERIAL

RELATED APPLICATIONS

The present application is a continuation-in-part of U.S. patent application Ser. No. 08/125,092 filed Sep. 21, 1993, now abandoned.

BACKGROUND OF THE INVENTION

1. Field of the Invention

The present invention relates to insulative fabric materials and particularly to thermally insulative fabric materials having substantial loft.

2. Description of Related Art

It is recognized that the ability of an insulative layer to entrap a large amount of air improves its thermal insulative properties. Until recently, some of the best materials to provide these properties were natural insulations, such as wool or feathers.

While natural insulations have many advantages, these materials likewise have many deficiencies. Wool is heavy, it is prone to odor, it is uncomfortable against one's skin, and it has limited loft. On the other hand, feathers and down are lofty and warm when dry, but are easily compromised by damp, they are expensive and difficult to contain, their loft is easily lost, and they cause allergic reactions in some.

To address some of these concerns, various synthetic insulations have been developed. Many of these products comprise polymer fibers or fabrics which effectively hold warmth by entrapping air within their mesh, yet are easy to use, light, durable, hypoallergenic, non-odor forming, and sometimes breathable. Examples of such materials are sold by Minnesota Mining and Manufacturing Co. (3M), of St. Paul, Minn., under the trademark THINSULATE, and by E. I. dupont de Nemours and Company (Dupont), of Wilmington, Del., under the trademark THERMOLITE.

While these materials are successful in part, they continue to suffer from a number of deficiencies. Synthetic insulations still lack the high loft which has for so long been coveted. Loft can be produced, but it is often at the cost of many layers of material with intrinsic added weight. Furthermore, many synthetic insulations lack resilience to deformation-losing warmth when mass is applied against them.

In an effort to improve these properties, further development efforts have continued. U.S. Pat. No. 4,118,531, granted to Hauser Oct. 3, 1978, teaches that a batting or webbing of polyester or polypropylene microfibers (around 10–15 microns in diameter) can be produced with good thermal properties. To brace these fibers against compression, a larger crimped fiber is incorporated into the microfiber batting to improve resilience and reduce matting of the fibers over time. Nonetheless, the amount of resilience to deformation of this composite is limited to the bulk fiber's ability to maintain its crimp. Additionally, the bulk of these fibers is believed to restrict their useful applications.

Still another improvement in fiber loft is sought, this time in a stretchy fabric material, in U.S. Pat. No. 4,551,378 issued Nov. 5, 1985 to Carey, Jr. Bicomponent fibers are taught which can be crimped and bonded together. However, further improvement in resilient loft is still believed possible.

In WIPO Application WO 93/00390, published 7 Jan. 1993, owned by 3M, energy expandable microspheres are mixed with a fibrillated polyolefin matrix suspension and then expanded to produce a thermally insulative membrane. With the expandable microspheres embedded in fibrils of the fibrillated polyolefin, an expanded polyolefin sheet material is produced by applying energy to expand the microspheres. A light, breathable, thermally insulative material can be produced using this process. Moreover, the insulative material produced is quite resilient to deformation.

Regretfully, the processing of insulation in the manner taught by WO 93/00390 continues to be constrained. To be effective, a fibrillated polyolefin is required, inasmuch as expansion of the insulation is dependent upon embedding the expandable microspheres within the linked microscopic fibrils of such material. More burdensome is the fact that presently available microsphere technology is keenly limited in its temperature range-with deterioration or complete destruction of the microspheres normally occurring at temperatures above about 200° C. when exposed for more than a few minutes. Such temperature limitations restrict many desirable processing steps, such as sintering, which would otherwise be advisable with a polymer material alone.

A number of other patents have taught that microspheres can be combined with a binder material in order to adhere them together, sometimes for thermally insulative applications. For instance, U.S. Pat. No. 3,615,972 to Morehouse, Jr., et al. teaches how to produce a variety of expandable microspheres and the use of different binder or coating materials to hold such microspheres in place. Similarly, U.S. Pat. No. 5,155,138 to Lundgvist also teaches expandable microsphere formation but again teaches its use with a binder material. U.S. Pat. No. 4,929,020 to Takashima et al. teaches use of expandable microspheres in a coating composition that serves as a binder.

The problem with all such previous attempts to use expandable microspheres with a binder material is that the binder materials tend to limit many desirable properties of the thermal insulation. For example, binder material can add undesirable bulk, weight, and stiffness to an insulated article. Moreover, binder displaces air, reducing thermal insulative efficiency and restricting air permeability or "breathability." Finally, binder may also limit the compressibility or recoverability of the insulative material.

Despite these deficiencies, prior to the present invention, expandable microspheres have been applied as a thermal insulative material only when adhered together or to another material using some form of adhesive binder. The use of spheres alone or unadhered in thermal insulation has not been previously suggested, much less some method for accomplishing such a task.

Accordingly, it is a primary purpose of the present invention to produce an insulative material that is lightweight, durable, highly thermally insulative, and resilient to deformation.

It is another purpose of the present invention to produce an insulative material that retains significant thermal insulative properties even when wet or placed under compressive force.

It is still another purpose of the present invention to produce an insulative material that provides resilient properties with a wide variety of insulative materials.

It is a further purpose of the present invention to produce an insulative material that provides resilient properties of thermoplastic microspheres without limiting the initial processing procedures for the insulative materials.

These and other purposes of the present invention will become evident from review of the following specification.

SUMMARY OF THE INVENTION

The present invention is an insulative material with improved loft properties and methods to produce such insulation. In a basic form, the present invention embeds loose resilient thermoplastic microspheres within existing multiple-layered insulation. The microspheres are retained in the insulation by one of a number of disclosed structures and methods to prevent microsphere migration out of the insulation. Among the strategies for containing the microspheres are: including microsphere-impermeable barrier fabric surrounding the insulation, with the microspheres loosely contained within a confined cell; and/or providing an enmeshing insulative matrix entrapping the loose spheres.

While adding little additional weight to the insulation material, the resilient microspheres help to maintain the loft of the insulation during use and to restore loft even after being significantly compressed. As a result, numerous properties of the insulation are improved, including thermal insulation (even when wet), resilience to deformation, and compression resistance.

Ideally, expandable microspheres are employed which are motivated into the insulation through pores in a barrier layer or layers. Once in place, the expandable microspheres are expanded to a size too great to fit back through the pores in the barrier layer. In this manner, virtually any form of existing insulation material can be readily provided with the improved loft properties of the present invention—even after the insulation material has been incorporated into a final form. As a result, the process of the present invention is not handicapped by tight constraints on the type of insulation material which can be employed or the present limitations on processing conditions under which expandable microspheres may be used.

DESCRIPTION OF THE DRAWINGS

The operation of the present invention should become apparent from the following description when considered in conjunction with the accompanying drawings, in which.

DETAILED DESCRIPTION OF THE INVENTION

The present invention comprises an insulative material with improved loft characteristics and method for producing such material.

Figure 1:
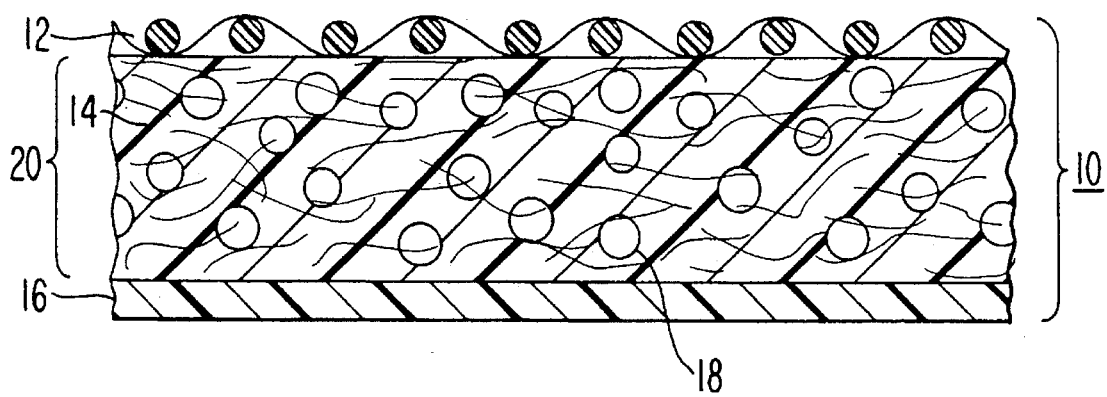
FIG. 1 is a cross-sectional view of one embodiment of an insulation material of the present invention.

As is shown in FIG. 1, in its simplest form, the present invention comprises layered insulation material 10 made from conventional multiple layers 12, 14, 16 of fabric material, into which resilient thermoplastic microspheres 18 are incorporated. The microspheres 18 are restrained within the material by containing them in a cell 20 defined between barrier layers of material 12, 16.

The key to the present invention is to retain microspheres within conventional insulation during normal use. To this end, a number of strategies can be employed. As is shown in FIG. 1, barrier layers 12, 16 can be provided comprising sufficiently closed structure that the microspheres cannot pass through them during normal use. In this case, the microspheres are loosely contained within a confined space of the cell. The barrier layers may be part of the original material of the insulation or may be a separate layer or layers of material applied on top of or between existing insulation layers. Other methods discussed below for retaining the microspheres within the insulation include providing a sufficiently entangled mesh of insulative fibers that loose microspheres will not migrate out of the insulation once installed therein, and/or partially adhering the microspheres within insulative fibers to prevent their separation from the insulation.

The microspheres produce a substantial loft in the material which is highly resilient to compression. The amount of loft and resilience is readily adjusted by varying the amount, type, size, and amount of "puff" of microspheres present in the insulation.

Preferably, the microspheres comprise expandable thermoplastic microspheres, such as those available from Nobel Industries Sweden, of Sundsvall, Sweden, under the trademark EXPANCEL®. Such microspheres comprise a thermoplastic shell entrapping a volatile liquid, such as isopentane. When subjected to heat or similar activation energy, the microspheres dramatically expand to many times their original size and retain such size when the activation energy is removed. The process for producing such material is explained in U.S. Pat. No. 3,615,972 issued Oct. 26, 1971, to Morehouse et al.

Expandable microspheres are commercially available in a variety of sizes and forms, with initial expansion temperatures generally ranging from 80° to 130° C. Expansion can usually be practiced between about 80° to 260° C. or above, depending upon a number of factors, such as dwell time. A typical EXPANCEL microsphere has an initial average diameter of 9 to 17 microns and an average expanded diameter of 40 to 60 microns. According to Nobel Industries, the microspheres have an unexpanded true density of 1250–1300 kg/m$^3$ and an expanded density below 20 kg/m$^3$.

As presently contemplated, the preferred microspheres for use in the present invention have the following properties: low density; resilience to deformation; expandable on demand; an average expanded size of at least 15 microns; and an expansion ratio of at least 1.5:1. Additionally, pre-expanded microspheres suitable for use in certain embodiments of the present invention are also commercially available from Nobel Industries under the designation EXPANCEL (e.g. type DE-091). Pre-expanded microspheres are also available from a number of other sources, such as under the product name DUALITE from Pierce & Stevens of Buffalo, N.Y.

The presently preferred method of producing insulation in accordance with the present invention is to use an initial insulation material including a barrier layer on at least one side having a porous structure, such as that shown in woven barrier layer 12. The porous barrier layer 12 should be selected with a pore structure large enough to allow unexpanded microspheres to pass easily into cell 20, but small enough to resist escape of expanded microspheres from the cell 20.

In operation, unexpanded expandable microspheres are motivated through the porous barrier layer 12 into cell 20. Such motivation can occur through any appropriate means, such as through use of a pressure differential, drawing unexpanded microspheres into the material through use of a partial vacuum generated in the insulation material and/or forcing the spheres into the material through use of air or other mechanical pressure. Other suitable means for inserting the microspheres before expansion include: incorporation of the microspheres within the cell area during the manufacturing process (e.g. through spraying or similar process); driving the microspheres into the insulation via centrifugation; etc.

As the term "cell" is used throughout this application, it is intended to encompass any confined space which resists the movement of microspheres through or out of the insulation. Ideal cells should be small enough to assure even loft throughout the insulation material (e.g. approximately 1 to 3 cm squares). However, depending upon the types of insulation material and microsphere materials used, the cells may take virtually any size and shape, including merely the outline of the entire insulation material, without necessarily limiting its effectiveness.

Once the microspheres are placed within the structure of the insulation, activation energy is applied to the material to cause the microspheres to enlarge. The enlarged microspheres 18 then are trapped between the barrier layers 12, 16, separating the barrier layers from one another and providing loft to the fabric material.

It is preferred by the present invention that the expandable microspheres are placed "loosely" within the cell without binder or adhesive to hold them in place. In this manner, the thermal insulation of the present invention gains the thermal insulative and resilient properties of expandable microspheres without the problems presented by binder materials, such as stiffness, added weight, reduced breathability, reduced resilience, or diminished thermal properties. In this regard, the use of the terms "loose" or "loosely" herein is intended to encompass any construction whereby the microspheres are retained in place without employing a binder or other coating adhesive that may diminish the thermal or mechanical properties of the present invention. It is the preferred intent of the present invention that the microspheres will be applied completely without binder or adhesive. If some adhesive is present or some adhesion does occur, it is considered important that the microspheres are essentially unadhered to other materials within the insulation, with the majority of their surface areas not attached to each other or to other material.

It should be understood that the use of the term "expandable microsphere" herein is intended to encompass any hollow resilient container filled with volatile fluid which is adapted to expand (i.e. before, during or after incorporation within the insulation). Although presently available microspheres are essentially ball-shaped particles adapted to expand when exposed to an energy source, it should be understood that such microspheres are quite resilient in their expanded form and it may be possible to compress and release the microspheres to achieve the expansion required for the present invention. Additionally, it may be possible to form such microspheres in a variety of other shapes, such as tubes, ellipsoids, cubes, particles, etc. As such, the term "expandable microsphere" in the context of the present invention is intended to include all applicable forms and uses of these products now known or later developed.

In one presently preferred embodiment of the present invention, EXPANCEL type 091 DU is employed. This product comprises an off-white dry powder with a particle size between 5 and 50 microns. The shell of the microsphere comprises acrylonitrile or methacrylonitrile. The volatile liquid comprises isopentane.

In the embodiment shown in FIG. 1, the second barrier layer 16 is a continuous sheet of material having little or no porous structure, such as a polyurethane coated fabric material (e.g., that available from W. L. Gore & Associates, Inc., of Elkton, Md., under the trademark GORE-TEX®). As should be evident, in an instance where the second barrier layer 16 is impervious to air flow, such as with a sheet of polyethylene or similar plastic or polyurethane coated GORE-TEX® fabric, the introduction of microspheres under a pressure differential is dependent upon sideways flow of air through the insulation material to provide sufficient draw of the microspheres into the cell 20.

Figure 2:
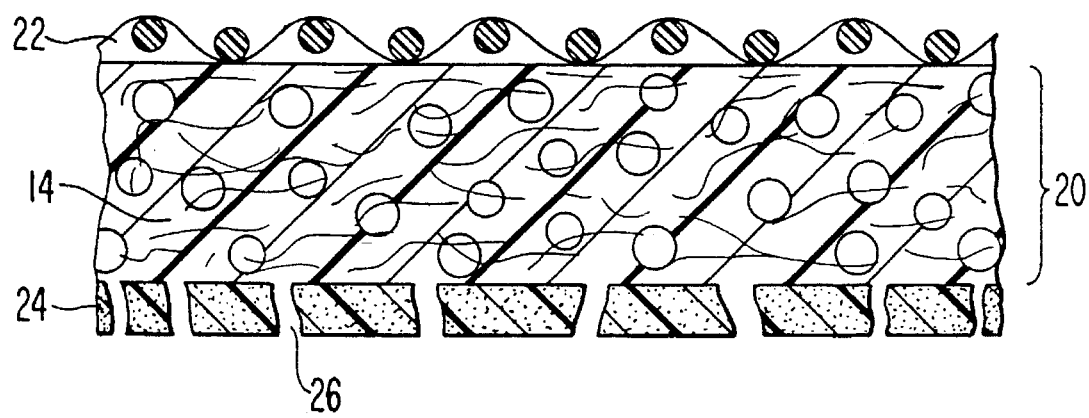
FIG. 2 is a cross-sectional view of another embodiment of an insulation material of the present invention.

An alternative embodiment of the present invention is shown in FIG. 2 wherein a first barrier layer 22 is again provided in the form of a woven material. Second barrier layer 24, however, is a porous membrane, such as a membrane of expanded polytetrafluoroethylene (PTFE), having micropores 26 therein. The porous nature of this second barrier layer 24 provides another avenue for the introduction of microspheres and/or improved means to provide pressure differential flow through the material. For many applications, the second barrier layer 24 may simply be constructed from the same material as the first barrier layer 22.

In the above described method where microsphere penetration is required, preferred barrier layers for use with the present invention comprise a material with sufficient porosity to allow unexpanded microspheres to pass therethrough, but of sufficiently restricted porosity to prevent expanded micropsheres from passing therethrough. Another suitable barrier layer is CAMBRELL fabric, available from Camtex Fabrics Ltd. of Workington, Cumbria, United Kingdom. This material is a multi-filament non-woven material manufactured from a blend of type 6 and type 66 nylon fiber. It has a general porosity (i.e., openings) of about 1–10 microns across.

In both of the embodiments of FIGS. 1 and 2, multiple layers of insulative fabric 14 are provided within the cell 20 between the first and second barrier layers. Common insulative material in this regard include: synthetic fibers such as acrylic, polyester, polypropylene, polyethylene, polyolefins, RAYON, polyamindes, acetates, etc.; synthetic fabrics such as woven or non-woven materials made from any of the above fibers; and/or natural insulators such as wool fiber or weave, feather/down, cotton fibers or fabrics, silk fabrics, etc.

The ideal insulative layer 14 comprises an open structure through which the microspheres can readily intersperse and in which the microspheres can become entrapped once enlarged. Preferred insulative layers comprise microdenier fibers of polyester, polyolefin, polyethylene, or similar materials and/or blends thereof. Preferably, the materials comprise entangled microdenier fibers which are discrete and unconnected elements, such as the structure found in THERMOLITE insulation available from DuPont comprising polyester fibers, or THINSULATE insulation available from 3M comprising a blend of polyester and polyolefin fibers.

Other commercial insulation materials which may be suitable for use with the present invention include: AEROZIP polyester insulation available from Toray; HOLLOFIL hollow polyester fiber insulation available from Dupont; POLARGUARD continuous filament fiber insulation available from Hoechst Celanese; POLARTEC insulation available from Malden Mills; PRIMALOFT microfiber insulation available from Albany International; QUALLOFIL hollow polyester fiber available from Dupont; THERMALON olefin insulation with polyester batting available from Thermalon Industries; THERMORE polyolefin/polyester/resin blend insulation available from FISI/Concept III; TREVIRA LOFT nine denier polyester staple fiber insulation available from Hoechst Celanese; and ULTRFIBRE reflected metal plated fiber insulation available from Ultrafibre, Inc. Additionally, as has been explained, the present invention may also be incorporated with a variety of natural insulation materials, such as wool fibers or down.

The use of an intermediate insulative layer or layers is preferred for a number of reasons. First, the insulative layer provides the primary areas for containment of insulative air. Although the insulative layers can be provided on the outside of one or both of the barrier layers, the loft characteristics of the present invention are far better enhanced by including at least some insulative material within the cell 20 which can be "puffed up" by the microspheres.

Second, the microspheres are believed to function far better in the present invention if some network is included to prevent the microspheres from flowing unrestrained through the cell 20. This concern is vastly increased where large cells are used in which the microspheres will tend to conglomerate at a lowest point during use.

Figure 3:
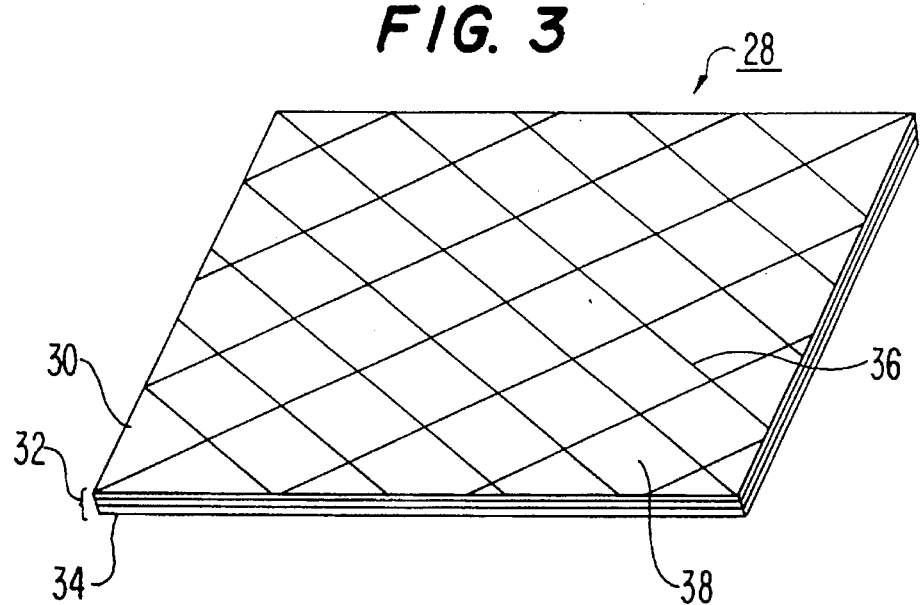
FIG. 3 is a three-quarter isometric view of conventional quilted insulative material employed as initial substrate for the present invention.
Figure 4:
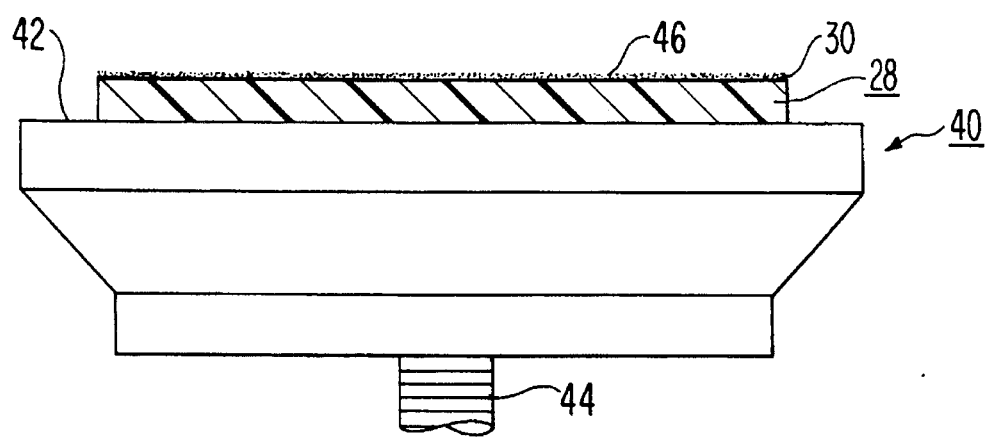
FIG. 4 is a side view of insulative material mounted on a vacuum apparatus employed in the present invention, the insulative material including a layer of unexpanded expandable thermoplastic microspheres thereon.
Figure 5:
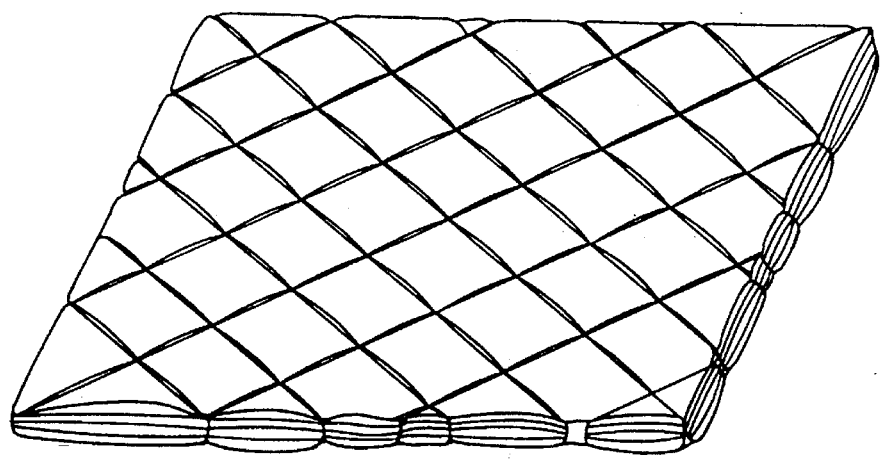
FIG. 5 is a three-quarter isometric view of a high-loft quilted insulative material of the present invention.

One general example of a possible process of installing expandable microspheres into an existing insulation material is shown in FIGS. 3 through 5. FIG. 3 shows a conventional multiple layered insulation material 28. This material comprises a top fabric layer 30, multiple intermediate fabric layers 32, and a bottom layer 34. Suitable insulation material for use in this embodiment includes THINSULATE insulation available from Minnesota Mining and Manufacturing Company. The insulation can then be attached to a backing material, such as a CAMBRELL fabric (previously discussed) with a pore structure of entangled overlapping nylon fibers and typical openings of about 1 to 10 microns. For improved operation in the present invention, stitching 36 has been provided through the material in a conventional quilted-fashion. Each rectangle 38 of the quilt pattern will define one cell of the present invention.

In order to motivate expandable microspheres into the insulation, a pressure differential must be established. To this end, the initial insulation material 28 can be placed on an apparatus 40 capable of generating a partial vacuum within the insulation. In the apparatus 40 shown in FIG. 4, the insulation material 28 is placed on a plate 42 having numerous holes (not shown) therein in fluid communication with the insulation material 28. A vacuum line 44 is connected to the plate to pull air from the insulation material via the holes.

A layer 46 of microspheres is spread evenly across the top layer 30 of the insulation 28. By way of illustration, a layer of expandable microspheres in a granular form, such as EXPANCEL brand microspheres, type DU-091, acquired from Nobel Industries Sweden, can be spread in a layer comprising about 10 to 100 g/cm$^2$.

A vacuum of about 100 mm Hg at 0° C. is applied to this material for a period of about 1 to 15 seconds until a significant amount of the microspheres have been aspirated into the material. Excess microspheres then can be wiped or blown from the surface. Alternatively, various powder dispensing systems can be used to apply the expandable microspheres on a continuous basis.

Formed in this manner, the insulation loaded with microspheres is subjected to heat or other activation energy to cause the microspheres to expand in place. For example, placing the loaded insulation material in a convection oven set at about 150° to 260° C. for a period of about 1 to 15 minutes. Once expanded, the final product 48 will assume a puffed form such as that shown in FIG. 5.

Figure 6:
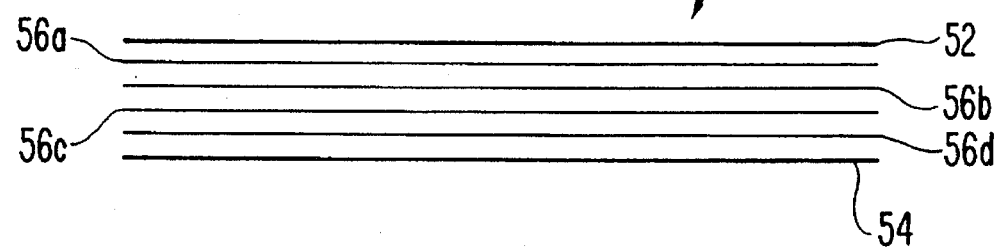
FIG. 6 is a cross-sectional view of one embodiment of a multiple layered insulative material of the present invention.
Figure 7:
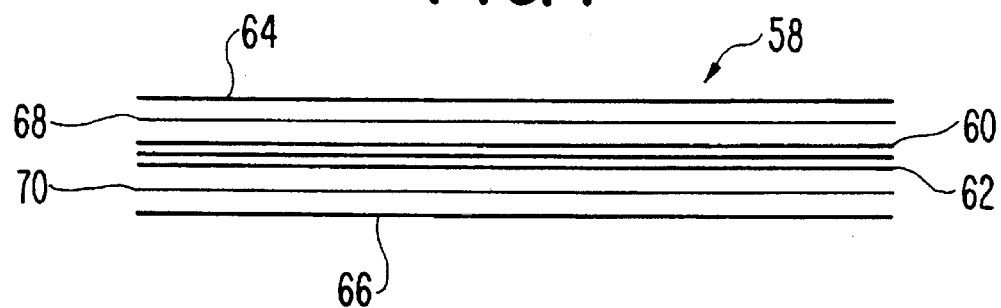
FIG. 7 is a cross-sectional view of another embodiment of a multiple layered insulative material of the present invention.

Further alternative constructions of the present invention are shown in FIGS. 6 and 7. FIG. 6 illustrates an unexpanded insulation 50 having as barrier layers its two outermost surfaces 52, 54. Multiple layers of insulation 56a, 56b, 56c, 56d are positioned between the barrier layers. In this construction, the microspheres should be randomly spread between the two barrier layers 52, 54, inter-meshed within the intermediate layers 56a–56d.

A somewhat different construction of insulation 58 is shown in FIG. 7. In this embodiment, barrier layers 60, 62 are embedded within the material, with other layers 64, 66 positioned on the outside of the barrier layers. One purpose of this construction might be to allow for the introduction of outer layers of specific utility (e.g. more durable material, waterproof material, impermeable material, etc.) which can better protect the barrier layers 60, 62 and the insulation. Additionally, as has been noted, additional insulation layers 68, 70 may be included on the outside of the barrier layers 60, 62 to address specific operational needs.

Without intending to limit the scope of the present invention, the following serve as examples of how the present invention may be practiced:

EXAMPLE 1

Insulation material purchased from Minnesota Mining and Manufacturing Co. (3M) under the trademark THINSULATE® was modified by sewing a supporting material of CAMBRELL fabric to one side using a quilting pattern as is commonly done in the apparel industry. The THINSULATE insulation comprises a polyolefin/polyester mixture of microfibers (reported to be a blend with a ratio of approximately 65:35). A 33×33 cm (13"×13") sheet of supported THINSULATE having a total thickness of 0.300 cm (0.118") and weighing 40.55 g was then impregnated with unexpanded thermoplastic microspheres available from Nobel Industries under the trade name EXPANCEL, Type DU-091. The technique utilized for impregnating the THINSULATE was as follows:

1. 2.35 grams of EXPANCEL DU-091 was evenly sifted on top of the non-fabric surface of the supported THINSULATE material.

2. The underside of the material was then subjected to a vacuum source from a conventional commercial shop vacuum cleaner. This drew in and distributed the unexpanded EXPANCEL powder throughout the thickness of the material.

3. The impregnated material was then placed in a convection oven at 180° C. for 3 minutes in order to expand the microspheres and puff the insulation.

4. The excess microspheres were then removed from the surface of the material with an air jet.

The puff material had a final thickness of 0.465 cm (0.183") and weight of 42.15 g. This calculates to a thickness increase of 55% with a weight increase of only 3.9%. The material exhibited a greatly improved resistance to compression and a more resilient nature than the original untreated material.

A thermal conductivity test was then performed on the above puffed sample and a non-modified supported THINSULATE sample. A sample of each measuring 30.5×30.5 cm (12 inches) square was tested according to ASTM C518 procedures using the Holometrics Rapid K Thermal Conductivity Instrument Model RK 80. A constant 20° C. water bath was supplied.

The equation used to calculate thermal conductivity (k) of an unknown measured in BTU-INCH/(HR-FT$^2$-°F.) is as follows:

$$k = k_c[(Q)(DX)(DT)_c(DT)]\% \ [(Q)_c(DX)_c(DT)] \text{ where:}$$

$k_c$=thermal conductivity of calibration sample

Q=total heat flow

DX=thickness of sample

DT=temp of hot face—temp of cold face ( )$_c$=calibration sample

DT for testing was 30° C. with the upper face at 60° C. and the lower face at 30° C.

Thermal conductivity (k) for the puffed sample was calculated to be 8.928×10$^{-5}$ cal/((s)(cm)(°C)) (i.e. 0.259 BTU-INCH/(HR-FT$^2$-°F.)). The non-modified supported THINSULATE sample had a calculated value of 8.892×10$^{-5}$ cal/((s)(cm)(°C)) (i.e. 0.258 BTU-INCH/(HR-FT$^2$-°F.))

EXAMPLE 2

Another 33×33 cm (13"×13") sheet of supported THINSULATE having a total thickness of 0.300 cm (0.118") and weighing 39.87 g was then impregnated using 7.05 g of EXPANCEL DU-091. The same technique as Example 1 was used for impregnating the THINSULATE insulation.

After heating, the puffed material had a final thickness of 0.706 cm (0.278") and weight of 44.85 g. This calculates to an increase in thickness of 135% and weight increase of only 12.5%. The material exhibited an even greater improved resistance to compression and a more resilient nature than the sample of Example 1.

A test for thermal conductivity (k) was conducted as in Example 1. The sample calculated to be 9.135×10$^{-5}$ cal/((s)(cm)(°C.)) (i.e. 0.265 BTU-INCH/(HR-FT$^2$-°F.)).

EXAMPLE 3

A 27×15 cm (10.5"×5.75") sheet of THINSULATE insulation having a total thickness of 0.541 cm (0.213") and weighing 8.52 g was impregnated using 2.90 g of EXPANCEL DU-091. The THINSULATE insulation was unsupported (i.e. it had no separate backing material applied to it). The same technique as Example 1 was used for impregnating the THINSULATE insulation.

After heating, the puffed material had a final thickness of 1.481 cm (0.583") and weight of 10.27 g. This calculates to an increase in thickness of 174% and a weight increase of only 20.5%. The material exhibited a greatly improved resistance to compression and a more resilient nature than the untreated sample.

EXAMPLE 4

A 30.5×30.5 cm (12"×12") sheet of supported THERMOLITE® insulation commercially available from E. I. DuPont de Nemours and Co., Wilmington, Del., having a total thickness of 0.381 cm (0.150") and weighing 36.95 g was impregnated using 7.00 g of EXPANCEL type DU-091. The THERMOLITE insulation comprises fine denier polyester fibers. The same technique as Example 1 was used for impregnating the THERMOLITE insulation.

After heating, the puffed material had a final thickness of 0.754 cm (0.297") and weight of 41.40 g. This calculates to an increase in thickness of 98% and a weight increase of only 12.0% The material exhibited a greatly improved resistance to compression and a more resilient nature than the untreated sample.

EXAMPLE 5

A moisture vapor transmission rate test (MVTR) was conducted on the puffed modified supported THINSULATE and the non-modified supported THINSULATE samples of Example 1. This test apparatus consists of a reservoir filled with distilled water maintained at 23° C. The reservoir is covered by a porous expanded polytetrafluoroethylene (ePTFE) membrane having a high moisture vapor transmission rate (MVTR). Cups having a mouth diameter of 8.9 cm (3.5") are prepared by partially filling the cup with potassium acetate and then covering the mouth of the cup with the same high MVTR ePTFE membrane. Samples to be tested are then placed on the membrane covering the reservoir and weighed cups of the potassium acetate are placed membrane side down onto the samples. A weighed control cup of potassium acetate is placed membrane side down directly onto the reservoir membrane. After 30 minutes, the cups of potassium acetate are weighed. The weight gain is calculated and then MVTR expressed in [(gm/meter$^2$)/24 hours] is calculated using the following formula:

$$\text{MVTR} = [\text{weight gain (gm)}] \times [433960/\text{Test time(min)}]$$

The MTVR results of this test were:

| SAMPLE | AVERAGE (OF 3) | STD. DEV. |
| --- | --- | --- |
| PUFFED | 448 | 148 |
| NON-MODIFIED | 1165 | 29.1 |

EXAMPLE 6

Figure 8:
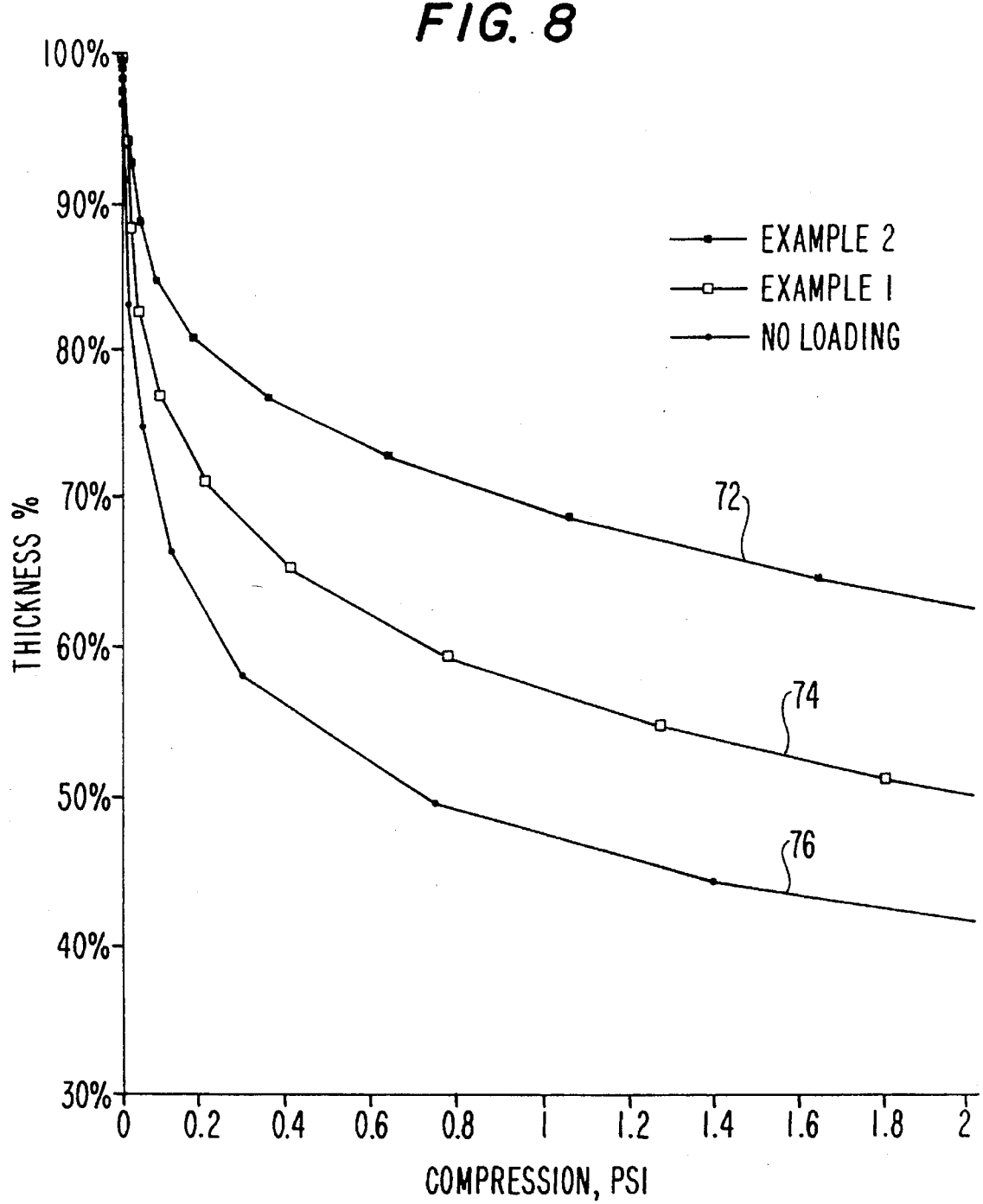
FIG. 8 is a graph depicting the amount of resistance to compression of two samples of insulative material of the present invention as compared with conventional insulative material.

A compressive force was applied to 30.5×30.5 cm (12"×12") cut samples of Examples 1 and 2. The thickness was measured at various load levels. The percentage of original thickness was calculated and plotted as a function of compressive load. The results of this test are shown in the graph of FIG. 8. As can be seen, the modified samples, represented by lines 72 and 74, show a far greater resistance to compression than the unmodified sample, represented by line 76.

Within the scope of the present invention there are various alternate methods contemplated for incorporating expandable microspheres within a matrix of insulation. Some examples of such alternate methods are described below:

EXAMPLE 7

Expandable microspheres, such as EXPANCEL type DU-091, can be directly sprayed onto a fibrous webbing of insulation during fabrication. To this end, spray apparatus such as that disclosed in U.S. Pat. No. 4,118,531 issued Oct. 3, 1978, to Hauser may be employed.

Figure 9:
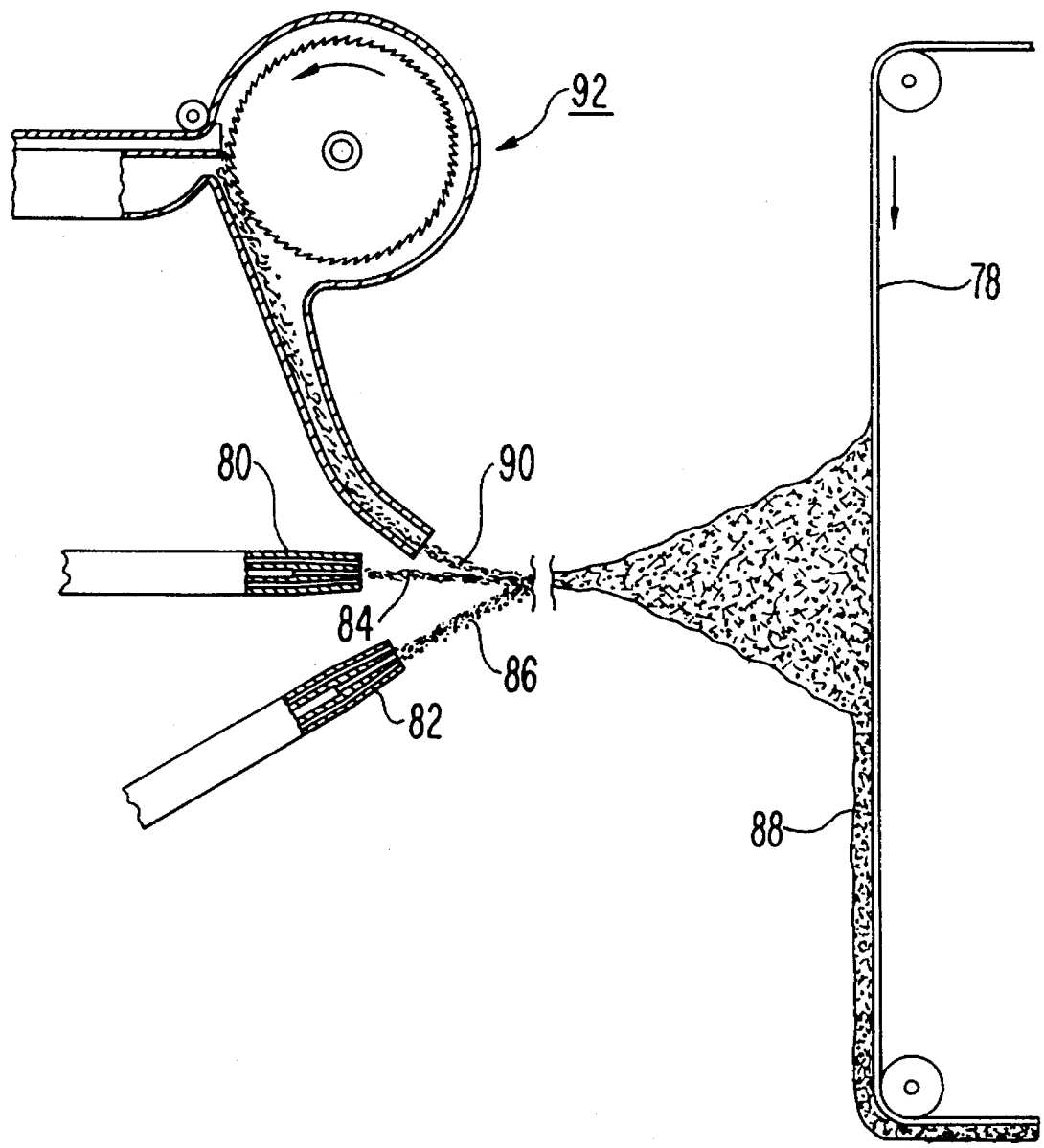
FIG. 9 is a schematic representation of one proposed embodiment of apparatus for intermixing a spray of microdenier fibers and microspheres for use in the present invention.

One proposed apparatus for this procedure is illustrated in FIG. 9. In this apparatus, a continuous web of substrate material 78 is pulled past microfiber blowing apparatus 80 and microsphere blowing apparatus 82. Blowing apparatus 80 deposits a layer of microfibers 84 on the substrate 78 in the manner described in U.S. Pat. No. 4,118,531. Simultaneously, blowing apparatus 82 can intermix a stream of expandable microspheres 86 into the microfibers 84 to produce a blended microfiber/microsphere layer 88 on the substrate. To impart some of the additional the properties taught in U.S. Pat. No. 4,118,531, a stream of crimped fibers 90 may likewise be intermixed into microfiber/microsphere layer 88 through the use of lickerin roller apparatus 92.

In this manner, the expandable microspheres should become entangled within the structure of the insulation and should remain within the mesh of the completed insulation once expanded even without the use of a specific barrier layer to prevent movement of the expandable spheres.

After the web of insulation is configured, the impregnated material can be placed in a convection oven or similar heating means at about 180° C. for about 3 minutes in order to expand the microspheres and puff the insulation. Once formed in this manner, the final insulation is contemplated to form a structure such as that shown in FIG. 10.

Alternatively, due to the automatic mixing which occurs through the method illustrated in FIG. 9, pre-expanded spheres may likewise be used in this process without the need for an expansion step with equally good insulative results expected.

Figure 10:
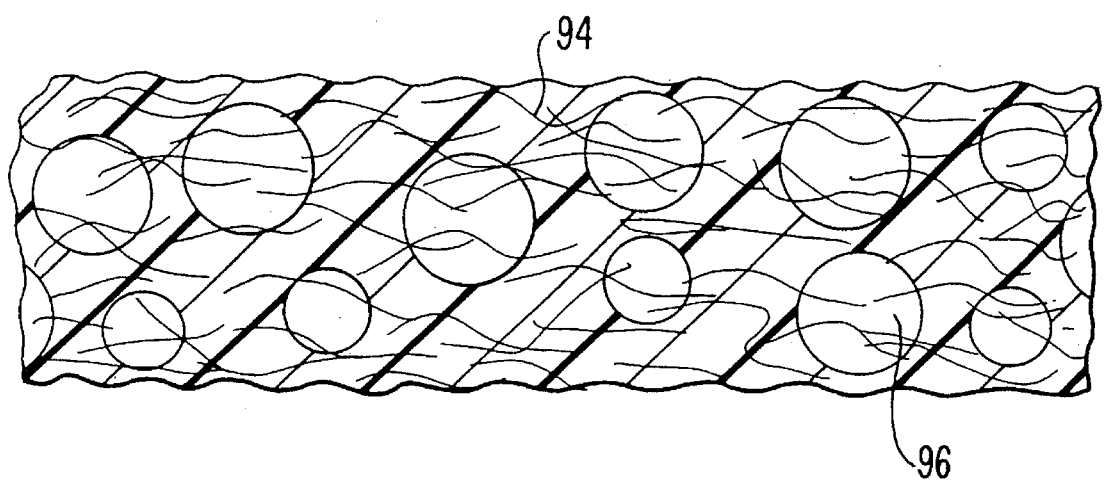
FIG. 10 is a cross-sectional view of another embodiment of an insulation material of the present invention wherein the microspheres are retained within the insulation without a barrier layer.

As is illustrated in FIG. 10, the completed insulation should comprise a mesh of insulative fibers 94 with expandable microspheres 96 entrapped therein.

EXAMPLE 8

Figure 11:
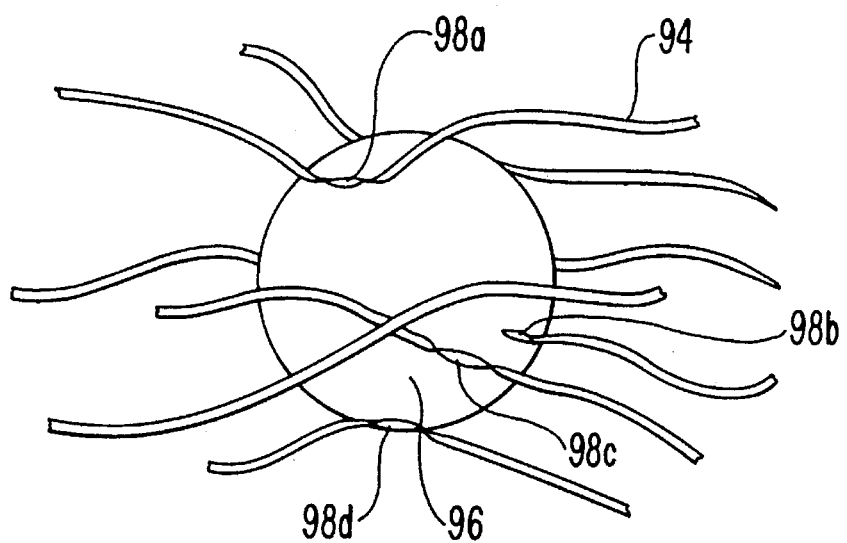
FIG. 11 is an enlarged view of a microsphere bonded to surrounding insulative fibers.

To achieve better amalgamation of the microspheres within the insulation material, it may also be useful to adhere the microspheres to surrounding insulation material. One possible approach in this regard is to expose the microspheres and the insulation to sufficient heat to bond the fibers to the microspheres. For convenience, this bonding can occur using the same or a similar heating process described in above Proposed Example 7 for expanding the microspheres in place. For example, it has been shown that heating for 2 minutes at about 260° C. is adequate to bond EXPANCEL type DU-091 microspheres to polyester and/or polyolefin fibers. As is shown in FIG. 11, when heated in this manner, the microspheres 96 will begin to soften and the fibers 94 will begin to adhere within the softened microspheres. The areas of adhesion 98a, 98b, 98c, 98d bond the microspheres in place relative to the surrounding insulative fibers and prevent migration of the spheres.

In place of or in addition to the heating process, an adhesive may also be added to the spheres and/or the fibers to assist in holding the microspheres in place. This process is particularly applicable where the microspheres are installed within the insulation during the fabrication process for the insulation itself.

Where fabrication of the insulation comprises the injection of the microspheres through existing insulation, it may be possible to coat the microspheres with a heat activated adhesive or a pre-cursor to an adhesive and then apply heat or add an activating agent once the microspheres are in place to hold their position. Alternatively, an adhesive may be added to the insulation material after the microspheres are installed.

It should be clear from the above examples that insulation made in accordance with the present invention demonstrates a very distinct improvement over conventional insulation materials. The introduction of expandable microspheres in the manner described introduces little additional weight yet provides greater thermal insulative properties, greater compression resistance, and better resilience. Additionally, the added loft produced by the microspheres in the present invention is not particularly affected by repeated compression of the insulation material. Further, this loft should resist the flattening effect of wet fibers, which can seriously compromise some existing insulations.

Moreover, unlike previous attempts to combine expandable microspheres with fibrillated polymers during the chemical processing steps of the insulation material, resilient insulative material made in accordance with the present invention can be combined with virtually any existing insulation material. This permits utilization of the benefits of expandable microspheres without limitation concerning insulation's particular chemical structure or its processing steps.

Areas where the present invention may be of particular use include: all forms of outdoor clothing (e.g. hats, jackets, shoes and boots, gloves, etc.); all forms of outdoor equipment (e.g. sleeping bags and pads, seat pads, etc.); household and industrial thermal insulation materials; etc.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A multilayered insulative material that comprises at least one porous barrier layer which defines at least one side of a confined space wherein the confined space contains at least one layer of fibrous insulation and wherein the fibrous insulation contains loose thermoplastic microspheres interspersed within the fibrous insulation with the microspheres being of sufficient diameter that they are unable to pass through the pores in the barrier layer so that the microspheres are retained in the fibrous insulation without the use of a binder, and wherein the microspheres provide resilient loft to the insulative material.

2. The insulative material of claim 1 wherein the confined space is defined by porous barrier layers on all of its sides.

3. The insulative material of claim 1 wherein insulative material further comprises a non-porous barrier layer.

4. The insulative material of claim 1 wherein the porous barrier layer has an average pore size of less than 10 microns; and the thermoplastic microspheres has an average diameter of greater than 15 microns.

5. The insulative material of claim 4 wherein the thermoplastic microspheres comprise expandable microspheres.

6. The insulative material of claim 1 wherein the fibrous insulation comprises microdenier fibers.

7. The insulative material of claim 1 wherein the confined space is a closed cell and wherein the insulative material comprises a plurality of closed cells.

8. A thermal insulative material that comprises at least one fibrous insulation layer comprising discrete entangled fibers; loose microspheres interspersed within the fibrous insulation layer, wherein the fibers of the insulation layer restrict the movement of the microspheres within the insulation without the use of a binder; and at least one barrier layer of fabric adjacent to the fibrous insulation layer wherein the at least one barrier layer is impermeable to the microspheres to retain the microspheres within the fibrous insulation layer without the use of a binder.

9. The thermal insulative material of claim 8 comprising two of said barrier layers wherein the barrier layers are present on both sides of the fibrous insulation layer.

10. The thermal insulative material of claim 9 wherein the two barrier layers are sealed to each other to form a cell containing the microspheres and fibrous insulation.

11. The thermal insulative material of claim 10 wherein the insulative material comprises a plurality of cells.

12. The thermal insulative material of claim 10 wherein said two barrier layers are porous.

13. The thermal insulative material of claim 10, wherein one of said two barrier layers is non-porous.

14. The thermal insulative material of claim 8 wherein the microspheres comprise expandable microspheres.

15. The insulative material of claim 8 wherein the insulative material comprises at least one porous barrier having an average pore size of less than 10 microns; and the microspheres have an average diameter of grater than 15 microns.

* * * * *